(12) United States Patent
Fukasawa et al.

(10) Patent No.: US 11,403,742 B2
(45) Date of Patent: Aug. 2, 2022

(54) IMAGE PROCESSING DEVICE, IMAGE PROCESSING METHOD, AND RECORDING MEDIUM FOR GENERATING BIRD'S EYE SYNTHETIC IMAGE

(71) Applicant: MITSUBISHI ELECTRIC CORPORATION, Tokyo (JP)

(72) Inventors: Tsukasa Fukasawa, Tokyo (JP); Kohei Okahara, Tokyo (JP); Ichiro Furuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 17/028,508

(22) Filed: Sep. 22, 2020

(65) Prior Publication Data
US 2021/0004943 A1    Jan. 7, 2021

Related U.S. Application Data

(63) Continuation of application No. PCT/JP2018/012852, filed on Mar. 28, 2018.

(51) Int. Cl.
*G06K 9/36* (2006.01)
*G06T 5/50* (2006.01)
(Continued)

(52) U.S. Cl.
CPC .......... *G06T 5/50* (2013.01); *G06T 7/97* (2017.01); *G06T 15/20* (2013.01); *G06T 17/10* (2013.01)

(58) Field of Classification Search
CPC ..... G06T 7/194; G06T 2200/04; G06T 17/00; G06T 7/37; G06T 15/00; G06T 7/00; G06T 7/292; G06K 9/6267; G06K 9/628
See application file for complete search history.

(56) References Cited

U.S. PATENT DOCUMENTS 8,295,644 B2 * 10/2012 Shulman .................... G06T 3/40
                                                                   348/42
9,715,631 B2 *  7/2017 Takahashi ................. B60R 1/00
(Continued)

FOREIGN PATENT DOCUMENTS

JP    2000-184336 A    6/2000
JP    2010-128742 A    6/2010
(Continued)

*Primary Examiner* — Guillermo M Rivera-Martinez
(74) *Attorney, Agent, or Firm* — Birch, Stewart, Kolasch & Birch, LLP

(57) ABSTRACT

An image processing device includes: a solid object extraction unit that divides each of a plurality of captured images into a foreground image part occupied by an existent object and a background image part; a background complementing unit that complements each background image part; a background image synthesis unit that generates a background bird's eye synthetic image by performing bird's eye transformation and combining together the background image parts after undergoing the bird's eye transformation; a solid object recognition unit that acquires posture information on the existent object; a solid object projection unit that acquires a three-dimensional virtual object by using the posture information; a three-dimensional space superimposition unit that generates a three-dimensional space image by superimposing the three-dimensional, virtual object on the background bird's eye synthetic image; and a display image output unit that outputs a bird's eye synthetic image generated based on the three-dimensional space image.

9 Claims, 12 Drawing Sheets

(51) Int. Cl.
   *G06T 7/00*      (2017.01)
   *G06T 15/20*     (2011.01)
   *G06T 17/10*     (2006.01)

(56) References Cited

U.S. PATENT DOCUMENTS

| | | | |
|---|---|---|---|
| 10,282,915 B1* | 5/2019 | Lin | G06T 17/00 |
| 2003/0031253 A1 | 2/2003 | Itokawa | |
| 2007/0085901 A1* | 4/2007 | Yang | H04N 7/181 |
| | | | 348/E7.086 |
| 2008/0043113 A1* | 2/2008 | Ishii | G06T 3/4038 |
| | | | 348/E7.086 |
| 2009/0121851 A1* | 5/2009 | Abe | G06T 3/4038 |
| | | | 348/E7.086 |
| 2010/0134593 A1* | 6/2010 | Kakinami | G06T 15/205 |
| | | | 348/148 |
| 2010/0211267 A1* | 8/2010 | Shimazaki | G08G 1/168 |
| | | | 340/932.2 |
| 2010/0284569 A1* | 11/2010 | Sakurai | G06T 3/00 |
| | | | 348/148 |
| 2012/0069151 A1* | 3/2012 | Tsai | G06T 7/174 |
| | | | 348/47 |
| 2013/0100286 A1* | 4/2013 | Lao | G06V 20/54 |
| | | | 348/148 |
| 2013/0222573 A1* | 8/2013 | Onuma | E02F 9/24 |
| | | | 348/82 |
| 2013/0230211 A1 | 9/2013 | Tanabiki et al. | |
| 2016/0379074 A1* | 12/2016 | Nielsen | G06K 9/6278 |
| | | | 348/143 |
| 2018/0253823 A1 | 9/2018 | Furuki et al. | |
| 2019/0094875 A1* | 3/2019 | Schulter | G06V 20/56 |

FOREIGN PATENT DOCUMENTS

| | | |
|---|---|---|
| JP | 4934308 B2 | 5/2012 |
| JP | 2012-147149 A | 8/2012 |
| JP | 5053043 B2 | 10/2012 |
| JP | 6239205 B2 | 11/2017 |
| WO | WO 2012/046392 A1 | 4/2012 |

* cited by examiner

Fig. 6
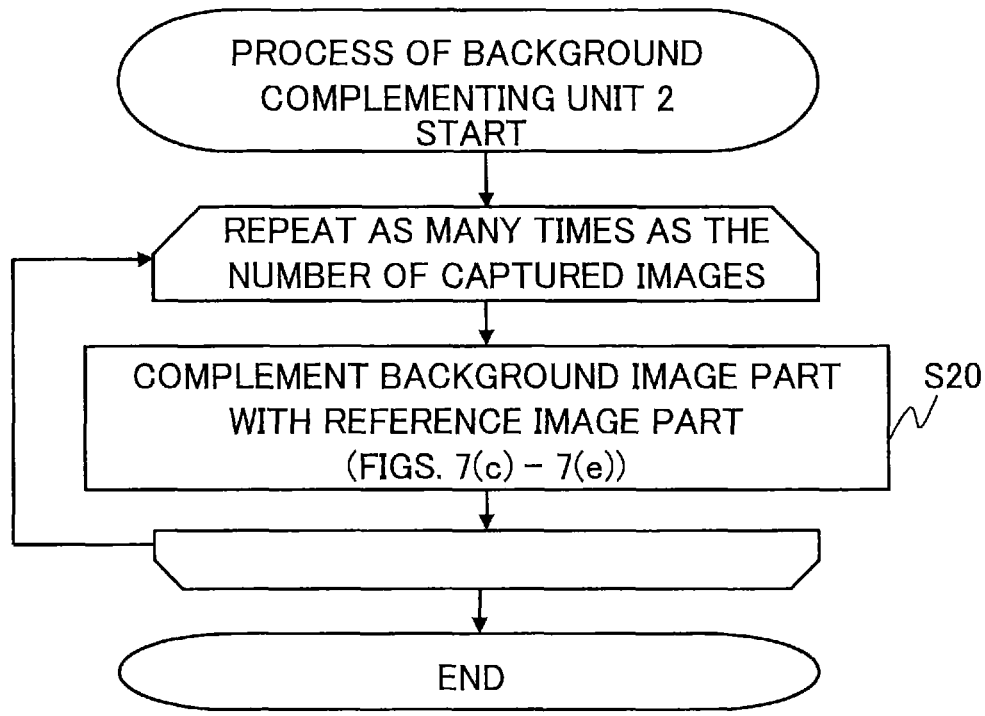
Fig. 7(a)
CAPTURED IMAGE 100a
Fig. 7(b)
EXISTENT OBJECT
FOREGROUND IMAGE PART 200a
Fig. 7(c)
PART WHERE EXISTENT OBJECT WAS EXTRACTED
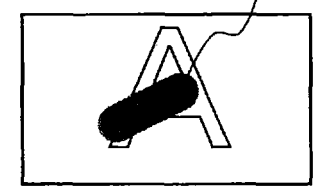
BACKGROUND IMAGE PART 300a
Fig. 7(e)
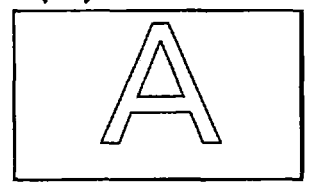
BACKGROUND IMAGE PART 301a
COMPLEMENT
Fig. 7(d)
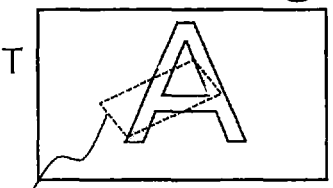
REFERENCE IMAGE PART 350a
REFERENCE IMAGE 350

BACKGROUND　　　　BACKGROUND
IMAGE PART 301a　　IMAGE PART 301b

BACKGROUND　　　　BACKGROUND
IMAGE PART 301a　　IMAGE PART 301b
AFTER BIRD'S EYE　　AFTER BIRD'S EYE
TRANSFORMATION　　TRANSFORMATION

BACKGROUND BIRD'S EYE
SYNTHETIC IMAGE 302 ial Application No. PCT/JP2018/012852 having an international filing date of Mar. 28, 2018.

IMAGE PROCESSING DEVICE, IMAGE PROCESSING METHOD, AND RECORDING MEDIUM FOR GENERATING BIRD'S EYE SYNTHETIC IMAGE

CROSS-REFERENCE TO RELATED APPLICATION

This application is a continuation application of International Application No. PCT/JP2018/012852 having an international filing date of Mar. 28, 2018.

TECHNICAL FIELD

The present invention relates to an image processing device that generates a bird's eye synthetic image from a plurality of captured images, and to an image processing method and a recording medium storing a program used for generating a bird's eye synthetic image from a plurality of captured images.

BACKGROUND ART

There exists a technology of generating a plurality of bird's eye images by performing viewpoint transformation on a plurality of captured images obtained by a plurality of cameras and generating a bird's eye synthetic image by combining the plurality of bird's eye images together. Patent Reference 1 describes a technology of generating a bird's eye synthetic image by selecting a bird's eye image in which distortion of an image of a solid object is less significant from two bird's eye images after undergoing the viewpoint transformation based on the position of a boundary demarcating an image capture region common to two captured images and the position of the solid object in the common image capture region and using the selected bird's eye image.

PRIOR ART REFERENCE

Patent Reference

Patent Reference 1: Japanese Patent No. 6239205 (see claim 1 and FIG. 3, for example)

SUMMARY OF THE INVENTION

Problem to be Solved by the Invention

While the above-described conventional technology generates the bird's eye synthetic image by using the bird's eye image in which the distortion of the image of the solid object is less significant, there are cases where the solid object has distortion and gives a feeling of strangeness to a viewer.

An object of the present invention, which has been made to resolve the above-described problems, is to provide an image processing device capable of generating a bird's eye synthetic image hardly giving a feeling of strangeness to a viewer and an image processing method and an image processing program used for generating a bird's eye synthetic image hardly giving a feeling of strangeness to the viewer.

Means for Solving the Problem

An image processing device according to an aspect of the present invention includes: an image division unit that divides each of a plurality of captured images into a foreground image part occupied by an existent object as a solid object actually existing in an image capture target region common to the plurality of captured images and a background image part other than the foreground image part; a background complementing unit that generates a plurality of complemented background image parts by complementing each background image part by pasting a reference image part as a part of a previously acquired reference image to a region of the foreground image part; a background image synthesis unit that generates a background bird's eye synthetic image by performing bird's eye transformation of changing a viewpoint position of the plurality of complemented background image parts and combining together the background image parts that have undergone the bird's eye transformation; a solid object recognition unit that recognizes the existent object and acquires posture information on the existent object; a solid object projection unit that acquires a three-dimensional virtual object corresponding to the existent object by using the posture information; a three-dimensional space superimposition unit that generates a three-dimensional space image by superimposing the three-dimensional virtual object on the background bird's eye synthetic image; and a display image output unit that generates and outputs a bird's eye synthetic image as an image of the three-dimensional space image as viewed from above.

An image processing method according to another aspect of the present invention includes: a step of dividing each of a plurality of captured images into a foreground image part occupied by an existent object as a solid object actually existing in an image capture target region common to the plurality of captured images and a background image part other than the foreground image part; a step of generating a plurality of complemented background image parts by complementing each background image part by pasting a reference image part as a part of a previously acquired reference image to a region of the foreground image part; a step of generating a background bird's eye synthetic image by performing bird's eye transformation of changing a viewpoint position of the plurality of complemented background image parts and combining together the background image parts that have undergone the bird's eye transformation; a step of recognizing the existent object and acquiring posture information on the existent object; a step of acquiring a three-dimensional virtual object corresponding to the existent object by using the posture information; a step of generating a three-dimensional space image by superimposing the three-dimensional virtual object on the background bird's eye synthetic image; and a step of generating and outputting a bird's eye synthetic image as an image of the three-dimensional space image as viewed from above.

Effect of the Invention

According to the present invention, a bird's eye synthetic image hardly giving a feeling of strangeness to the viewer can be generated from a plurality of captured images.

BRIEF DESCRIPTION OF THE DRAWINGS

FIG. 6 is a flowchart showing a process performed by a background complementing unit of the image processing device according to the embodiment.

FIGS. 7(a) to 7(e) are explanatory drawings showing the process performed by the background complementing unit.

MODE FOR CARRYING OUT THE INVENTION

An image processing device, an image processing method and an image processing program according to an embodiment of the present invention will be described below with reference to the accompanying drawings. The following embodiment is just an example and a variety of modifications are possible within the scope of the present invention.

(1) Configuration (1-1) Hardware Configuration

Figure 1:
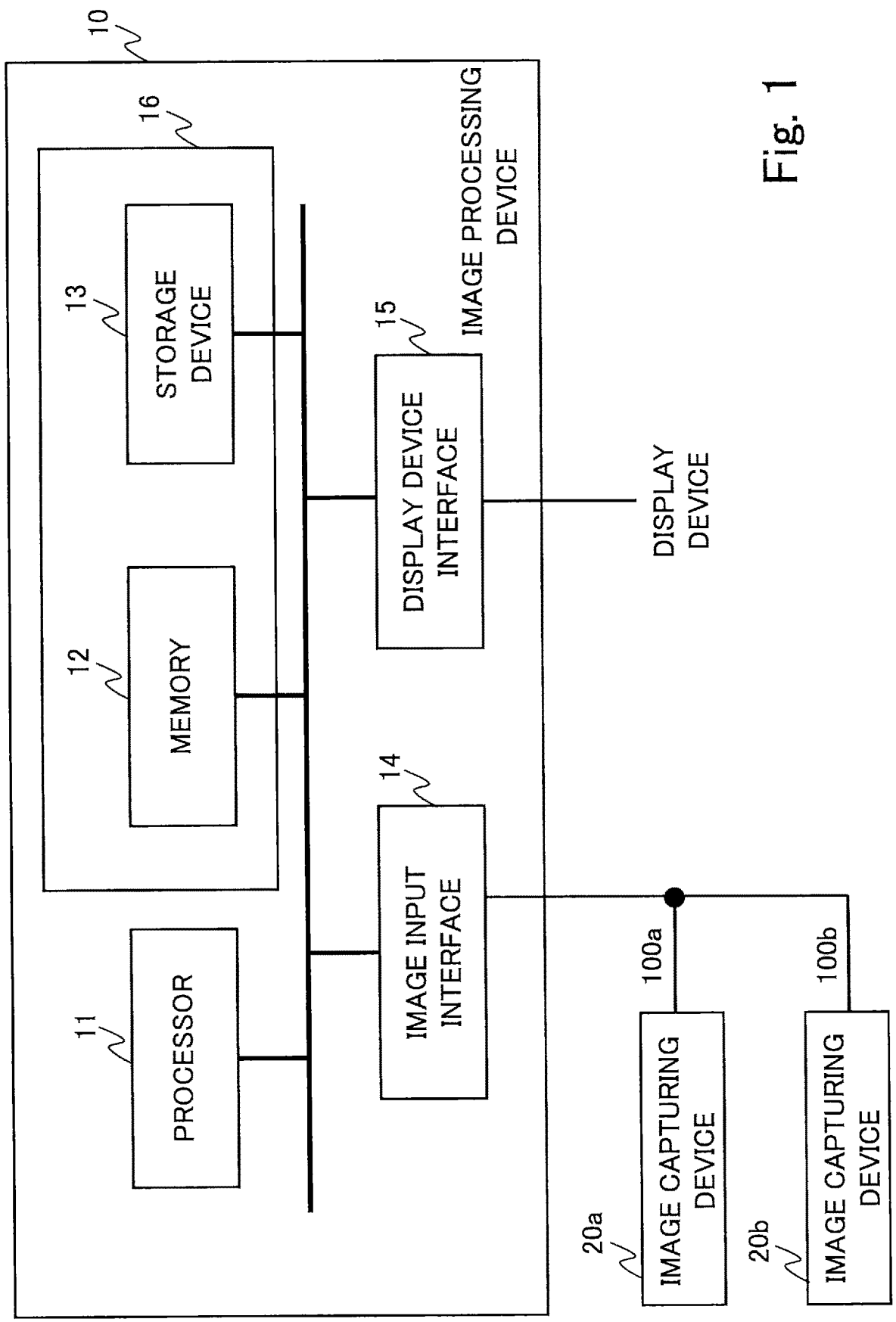
FIG. 1 is a diagram showing a hardware configuration of an image processing device according to an embodiment of the present invention.

FIG. 1 is a diagram showing the hardware configuration of an image processing device 10 according to an embodiment of the present invention. The image processing device 10 is a device capable of executing an image processing method according to this embodiment. The image processing device 10 is a computer, for example. As shown in FIG. 1, the image processing device 10 includes a processor 11 as an information processing unit, a memory 12, a storage device 13, an image input interface 14 that receives captured image data (also referred to simply as a "captured image"), and a display device interface 15 that outputs display image data. The memory 12 and the storage device 13 are referred to also as a storage unit 16.

The processor 11 performs various types of arithmetic processes while also performing various types of control processes on the hardware. The memory 12 is a main storage device. The memory 12 is a Random Access Memory (RAM), for example. The storage device 13 is an auxiliary storage device. The storage device 13 is a hard disk drive or a Solid State Drive (SSD), for example. The image input interface 14 is a device for taking a plurality of image signals, namely, a plurality of captured images provided from a plurality of image capturing devices into the image processing device 10. The display device interface 15 is a device for transmitting a display image to a display device such as a display.

In the example of FIG. 1, two image capturing devices 20a and 20b are connected to the image processing device 10. However, the number of image capturing devices connected to the image processing device 10 can also be three or more. Each of the image capturing devices 20a and 20b has a function of capturing images. Each of the image capturing devices 20a and 20b is a camera device (also referred to simply as a "camera") equipped with image pickup devices such as Charged-Coupled Devices (CCDs) or Complementary Metal-Oxide-Semiconductors (CMOSs) and a lens. The image capturing devices 20a and 20b are desired to be camera devices having the same structure as each other. The image capturing device 20a captures an image of a first image capture target region. The image capturing device 20b captures an image of a second image capture target region. The first image capture target region and the second image capture target region partially overlap with each other and have a common image capture target region part.

The image capturing devices 20a and 20b may be connected to the image input interface 14 of the image processing device 10 either by wire or by radio. The image capturing devices 20a and 20b and the image input interface 14 communicate with each other via an Internet Protocol (IP) network or via coaxial cables, for example. The method of the connection and the method of communication between the image capturing devices 20a and 20b and the image input interface 14 are not limited to particular methods. The image input interface 14 has a function of simultaneously (i.e., parallelly) receiving two (i.e., two screens of) captured images 100a and 100b provided from the image capturing devices 20a and 20b.

The two captured images 100a and 100b provided from the image capturing devices 20a and 20b are taken into the inside of the image processing device 10 via the image input interface 14 and stored in the memory 12. The two captured images 100a and 100b taken into the image processing device 10 are transformed into two pieces of bird's eye image data (also referred to simply as "bird's eye images") as images in which the viewpoint is placed above their respective image capture target regions, and thereafter the two bird's eye images are combined together. The transformation process for generating the bird's eye images is a "viewpoint transformation process". In this embodiment, the viewpoint transformation process for generating the bird's eye images is referred to as a "bird's eye transformation process". The processor 11 carries out the viewpoint transformation process and the combining process by loading and executing an image processing program stored in the memory 12 or the storage device 13. Display image data (also referred to simply as a "display image") as bird's eye synthetic image data (also referred to simply as a "bird's eye synthetic image") generated by the viewpoint transformation process and the combining process is transmitted to a display device such as a display via the display device interface 15.

(1-2) Functional Configuration

Figure 2:
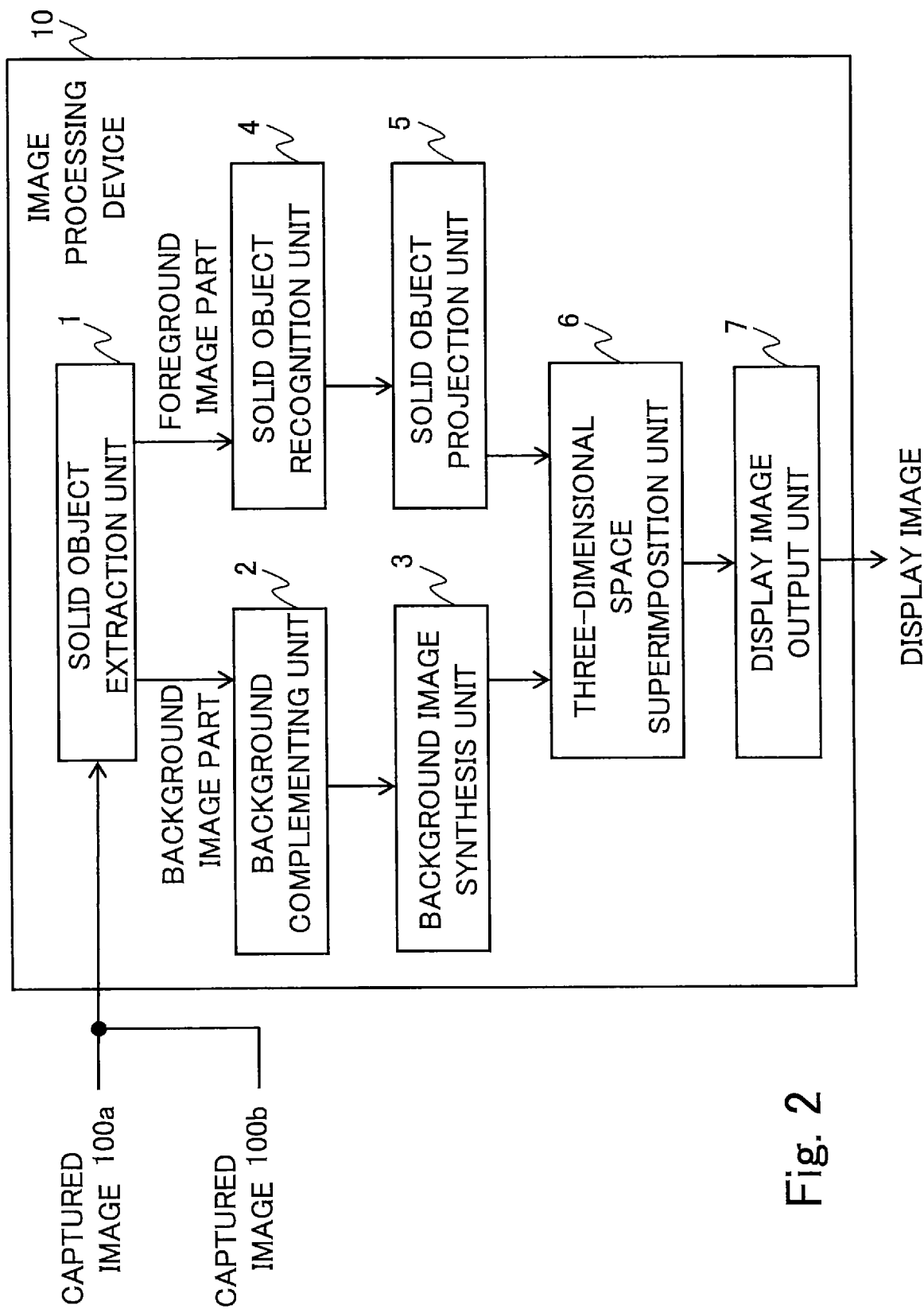
FIG. 2 is a functional block diagram showing the image processing device according to the embodiment.

FIG. 2 is a functional block diagram showing the image processing device 10 according to the embodiment. The image processing device 10 receives the captured images 100a and 100b respectively from the image capturing devices 20a and 20b and outputs the bird's eye synthetic image generated from the bird's eye images in the image capture target regions as the display image. The image processing device 10 includes a solid object extraction unit 1 as an image division unit that divides each of the captured images 100a and 100b into foreground image part data (referred to also as a "foreground image part") and background image part data (referred to also as a "background image part") by extracting a solid object (referred to also as an "existent object") as an actually existing object from each of the captured images 100a and 100b.

The image processing device 10 further includes a background complementing unit 2 that pastes a part of the background image part of one of previously acquired captured images 100a and 100b (referred to also as "reference image data" or "reference images") to a region in each of the captured images 100a and 100b where the solid object was extracted. The background image part of a reference image is referred to also as "reference image part data" or a "reference image part". The image processing device 10 further includes a background image synthesis unit 3 that combines the background image part of the captured image 100a and the background image part of the captured image 100b together.

The image processing device 10 further includes a solid object recognition unit 4 that recognizes the existent object that is the solid object extracted as the foreground image part and a solid object projection unit 5 that performs projection onto a selected three-dimensional virtual object corresponding to the foreground image part occupied by the extracted existent object (i.e., corresponding to the solid object). The three-dimensional virtual object is, for example, three-dimensional image data previously stored in the storage unit 16 for displaying a virtual solid object or three-dimensional image data generated to display a virtual solid object having a size corresponding to a solid object.

The image processing device 10 further includes a three-dimensional space superimposition unit 6 that arranges (namely, superimposes) the three-dimensional virtual object on a background image part formed in a virtual three-dimensional space by the background image synthesis unit 3 and a display image output unit 7 that outputs the bird's eye synthetic image, formed by superimposing the three-dimensional virtual object on the background image part, as the display image.

(1-3) Configuration Example

Figure 3:
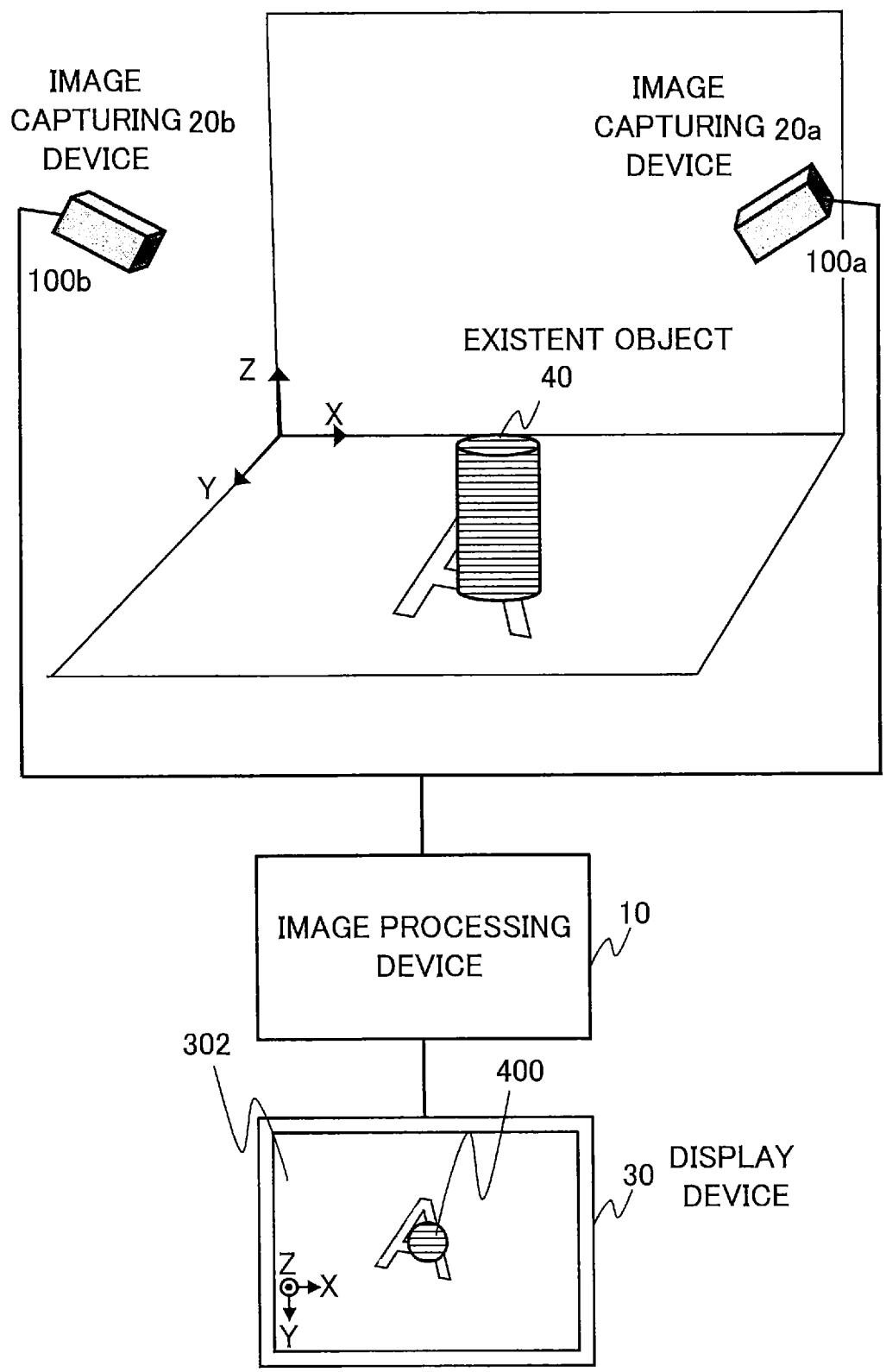
FIG. 3 is a diagram schematically showing a configuration example of an image processing system including the image processing device according to the embodiment, two image capturing devices and a display device.

FIG. 3 is a diagram schematically showing a configuration example of an image processing system including the image processing device 10 according to the embodiment, two image capturing devices 20a and 20b and a display device 30.

The solid object extraction unit 1 divides each of the captured images 100a and 100b into the foreground image part and the background image part by detecting the existent object 40 as an actually existing solid object in each of the captured images 100a and 100b and extracting the foreground image part as a part in the captured image corresponding to the existent object 40. The existent object 40 is, for example, a person, a vehicle, a product or the like. The solid object extraction unit 1 divides each of the captured images 100a and 100b into the foreground image part and the background image part by detecting the existent object 40, regarding the detected existent object 40 as the foreground image part, and regarding a part other than the foreground image part as the background image part. The background image part of the captured image 100a is an image part obtained by excluding the region of the existent object 40 as the solid object from the captured image 100a. The background image part of the captured image 100b is an image part obtained by excluding the region of the existent object 40 as the solid object from the captured image 100b. The process performed by the solid object extraction unit 1 will be described in detail later with reference to FIG. 4 and FIGS. 5(*a*) and 5(*b*) which will be explained later.

The background complementing unit 2 complements the background image part lacking the foreground image part by extracting a foreground image part as the region of the existent object 40 from a reference image stored in the storage unit 16 as a captured image in the past (e.g., an image captured by the same image capturing device) and pasting the reference image part as a part of the reference image in place of the extracted foreground image part. By this process, a background image part in which the region of the existent object 40 has been complemented with a part of the reference image (i.e., in which image data of a lacking part has been complemented with the reference image part data) is generated. The process performed by the background complementing unit 2 will be described in detail later with reference to FIG. 6 and FIGS. 7(*a*) to 7(*e*) which will be explained later.

The background image synthesis unit 3 generates a background bird's eye synthetic image 302 from two background image parts complemented by the background complementing unit 2. In order to generate the background bird's eye synthetic image 302, it is assumed as a precondition that each of the image capturing devices 20a and 20b has previously undergone calibration and internal parameters and external parameters of each of the image capturing devices 20a and 20b have been acquired by the image processing device 10. The internal parameters include information indicating the focal length, the position and direction of the optical axis center, etc. in regard to each of the image capturing devices 20a and 20b. The external parameters are information indicating camera position posture as the position and posture of each of the image capturing devices 20a and 20b, including installation position (installation coordinate) information, installation posture information (e.g., yaw, roll and pitch information) and so forth in the space as the image capture target. The background image synthesis unit 3 performs the bird's eye transformation process and the combining process by using the two background image parts complemented by the background complementing unit 2 and a reference table including pixel data indicating the correspondence between the two background image parts and the bird's eye synthetic image. The process performed by the background image synthesis unit 3 will be described in detail later with reference to FIG. 8 and FIGS. 9(*a*) to 9(*c*) which will be explained later.

The solid object recognition unit 4 first performs recognition of the existent object 40 as the solid object in the foreground image part extracted from the captured image 100a and the foreground image part extracted from the captured image 100*b*. The existent object 40 is a person, a vehicle, a product or the like, for example. However, the existent object 40 is not limited to a person, a vehicle or a product. Subsequently, the solid object recognition unit 4 acquires posture information on the existent object 40 from the foreground image part extracted from the captured image 100*a* and the foreground image part extracted from the captured image 100*b*, and stores an existent object identifier (ID) as identification information on the existent object 40, an existent object type indicating the type of the existent object 40, and the posture information on the existent object 40 in the storage unit 16 (e.g., the memory 12). The posture information on the existent object 40 is, for example, a table to be used when two-dimensional coordinate pixel data as the foreground image part extracted from the captured image 100*a* and the foreground image part extracted from the captured image 100*b* are transformed into three-dimensional coordinate pixel data. The posture information on the existent object 40 may either be obtained by image analysis in the foreground image parts or acquired by using a sensor as a device separate from the image capturing devices 20*a* and 20*b*. The method of acquiring the posture information on the existent object 40 is not limited to a particular method. The process performed by the solid object recognition unit 4 will be described in detail later with reference to FIG. 10 which will be explained later.

The solid object projection unit 5 acquires a three-dimensional virtual object 400 corresponding to the existent object 40 recognized by the solid object recognition unit 4. The three-dimensional virtual object 400 may be either selected from a plurality of three-dimensional virtual objects previously stored in the storage unit 16 based on the existent object 40 or generated by using the posture information. For example, when the existent object 40 is a person, a three-dimensional virtual object having a shape indicating a person is used. When the existent object 40 is an animal, a three-dimensional virtual object having a shape indicating an animal is used. Subsequently, the solid object projection unit 5 generates a projected three-dimensional virtual object 400 by performing the projection onto the three-dimensional virtual object corresponding to the foreground image part extracted from the captured image 100*a* by the solid object extraction unit 1 and the foreground image part extracted from the captured image 100*b* by the solid object extraction unit 1. Specifically, the solid object projection unit 5 displays an image of the three-dimensional virtual object 400, having a shape corresponding to the shape of the person as viewed from above, in superimposition with the position in the background bird's eye synthetic image 302 where the person as the existent object 40 was extracted. The process performed by the solid object projection unit 5 will be described in detail later with reference to FIG. 11 and FIG. 12 which will be explained later.

The three-dimensional space superimposition unit 6 arranges the background bird's eye synthetic image 302 generated by the background image synthesis unit 3 from the two complemented background image parts on a plane of Z=0 in a three-dimensional space represented by an XYZ orthogonal coordinate system, and arranges the projected three-dimensional virtual object 400 at the position coordinates of the foreground image part, for example. The process performed by the three-dimensional space superimposition unit 6 will be described in detail later with reference to FIG. 13 and FIG. 14 which will be explained later.

The display image output unit 7 outputs the bird's eye synthetic image of the three-dimensional space, in which the three-dimensional virtual object 400 has been superimposed on the background bird's eye synthetic image 302, to the display device 30 as the display image. The process performed by the display image output unit 7 will be described in detail later with reference to FIG. 15 which will be explained later.

(2) Operation (2-1) Solid Object Extraction Unit 1

Figure 4:
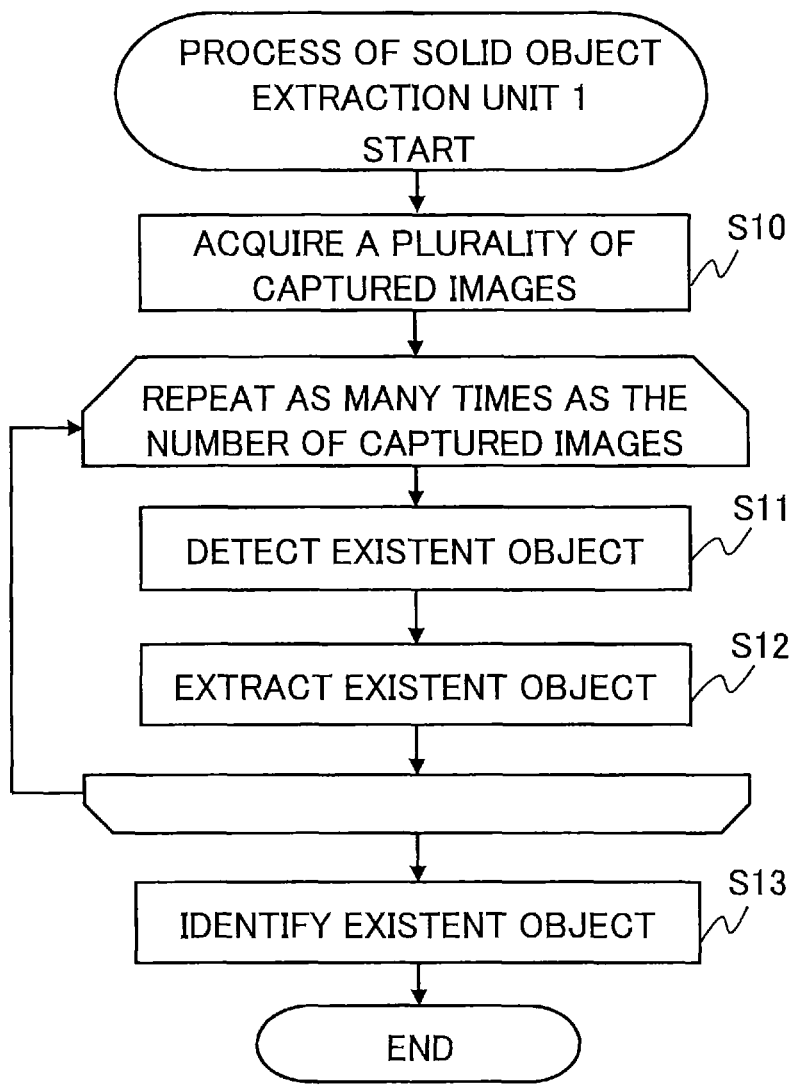
FIG. 4 is a flowchart showing a process performed by a solid object extraction unit of the image processing device according to the embodiment.
Figure 5A:
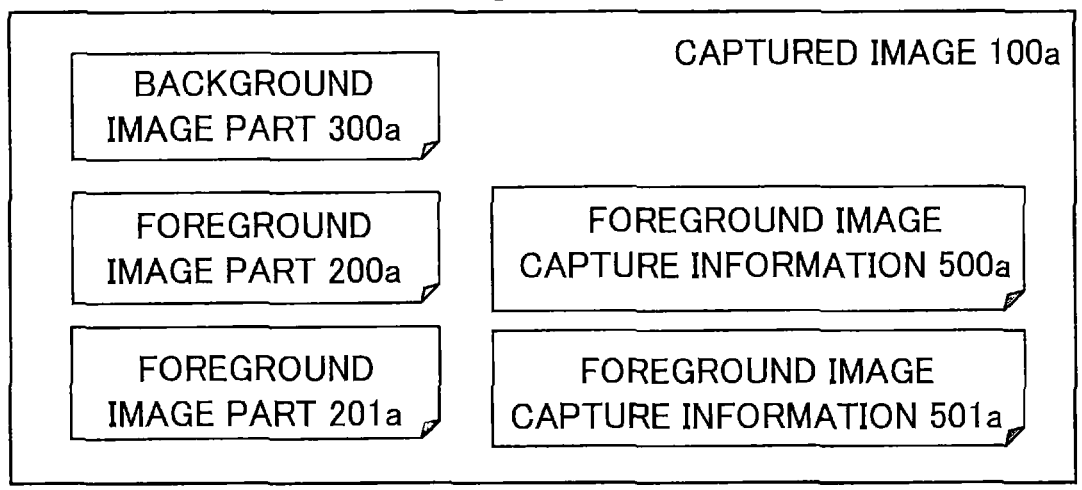
FIGS. 5(a) and 5(b) are explanatory drawings showing an example of foreground image parts, background image parts and foreground image capture information extracted respectively from captured images by the solid object extraction unit.
Figure 5B:
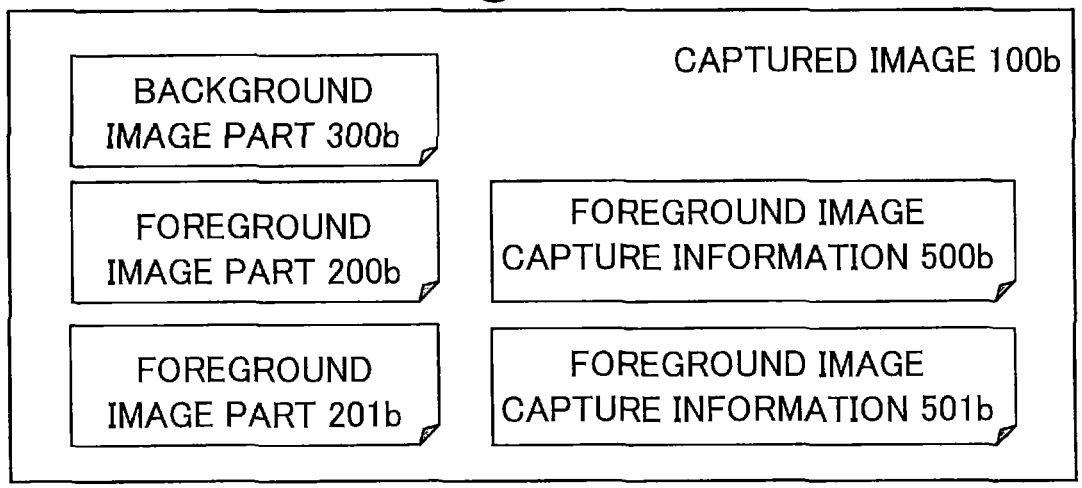

FIG. 4 is a flowchart showing the process performed by the solid object extraction unit 1 of the image processing device 10. FIG. 5(*a*) is an explanatory drawing showing an example of foreground image parts 200*a* and 201*a*, a background image part 300*a* and foreground image capture information 500*a* and 501*a* extracted from the captured image 100*a* by the solid object extraction unit 1. FIG. 5(*b*) is an explanatory drawing showing an example of foreground image parts 200*b* and 201*b*, a background image part 300*b* and foreground image capture information 500*b* and 501*b* extracted from the captured image 100*b* by the solid object extraction unit 1. While each of FIGS. 5(*a*) and 5(*b*) shows an example of extracting two foreground image parts and two pieces of foreground image capture information from one captured image, the number of foreground image parts is not limited to two and the number of pieces of foreground image capture information is also not limited to two.

The foreground image capture information includes, for example, the position coordinates of a part of the existent object 40 closest to the image capturing devices 20*a* and 20*b*, the resolution of the foreground image part, the size of the existent object 40, and so forth. The size of the existent object 40 is represented by, for example, the coordinates of four apices of a rectangle surrounding the existent object 40 (e.g., so as to circumscribe the existent object 40). However, the information indicating the size of the existent object 40 can be index information other than the coordinates of the four apices of the rectangle.

First, the solid object extraction unit 1 acquires a plurality of captured images 100*a* and 100*b* (step S10). In cases where the captured images 100*a* and 100*b* have undergone compression coding, the solid object extraction unit 1 decodes the captured images 100*a* and 100*b* and thereby acquires RAW image data corresponding to the captured images 100*a* and 100*b*. For example, in cases where video that has undergone compression coding into the H.264 format as a video compression standard is delivered by streaming from the image capturing devices 20*a* and 20*b*, the solid object extraction unit 1 performs decoding corresponding to the H.264 format on the captured images 100*a* and 100*b* and thereby acquires RAW image data of Red Green Blue Alpha (RGBA) 32-bit. However, the format of the image data acquired by the solid object extraction unit 1 is not limited to RAW image data of RGBA 32-bit.

Subsequently, the solid object extraction unit 1 detects at least one existent object 40 as a solid object such as a person, a vehicle or a product in the acquired RAW image data (step S11). The existent object 40 is, for example, a walking person, a traveling vehicle, a product in a production line of a factory, or the like. However, the existent object 40 is not limited to these objects but can be a different solid object such as an animal, a building, an obstacle, a plant facility or a robot.

Subsequently, the solid object extraction unit 1 extracts the detected existent object 40 from the RAW image data and thereby divides the RAW image data into the foreground image part as a regional part where the existent object 40 was captured and the background image part as a regional part other than the foreground image part (step S12). The extraction of the existent object 40 is carried out by using an image segmentation technology for image region extraction called graph cut, for example. By using graph cut, the solid object extraction unit 1 is capable of dividing each of the captured images 100*a* and 100*b* into the background image part and the foreground image part. However, the method of extracting the existent object 40 is not limited to the method using graph cut. For example, it is also possible to employ a learning-based image segmentation technology by use of deep learning (e.g., open pose) for the extraction of the existent object. The foreground image capture information regarding the existent object 40 includes, for example, the position coordinates of the foreground image part in the captured image, a value indicating the size of the foreground image part, and an identifier for identifying the existent object 40. Zero or one or more existent objects 40 as the targets are extracted from the captured images 100*a* and 100*b*. Therefore, the process from the detection of an existent object 40 to the extraction of the existent object 40 (steps S11 and S12) is repeated as many times as the number of captured images as processing targets.

Subsequently, the solid object extraction unit 1 makes identification of the existent object 40 in regard to the extracted existent object(s) 40 (step S13). When the image capture target region of the image capturing device 20*a* and the image capture target region of the image capturing device 20*b* include a common image capture target region part, there are cases where the captured images 100*a* and 100*b* include the same existent object 40. The solid object extraction unit 1 assigns each of a plurality of existent objects an identifier for identifying the existent object. When an existent object included in the captured image 100*a* and an existent object included in the captured image 100*b* are the same existent object, the solid object extraction unit 1 assigns the same identifier to the existent objects. For example, the solid object extraction unit 1 detects four foreground image parts 200*a*, 201*a*, 200*b* and 201*b* as shown in FIGS. 5(*a*) and 5(*b*), and judges that the number of actual existent objects is three when the foreground image part 201*a* and the foreground image part 201*b* are judged to be the same. The solid object extraction unit 1 receives the captured images 100*a* and 100*b* as inputs and outputs the background image parts 300*a* and 300*b*, the foreground image parts 200*a*, 201*a*, 200*b* and 201*b*, and the foreground image capture information 500*a*, 501*a*, 500*b* and 501*b*.

(2-2) Background Complementing Unit 2

FIG. 6 is a flowchart showing the process performed by the background complementing unit 2 of the image processing device 10. The background complementing unit 2 performs the background complementing by using the reference images previously stored in the storage unit 16 (step S20). The background complementing unit 2 performs the background complementing by using the foreground image capture information 500*a*, 501*a*, 500*b* and 501*b* corresponding to the foreground image parts 200*a*, 201*a*, 200*b* and 201*b* as the targets. The background complementing unit 2 acquires reference image parts having the same position coordinates and sizes as the foreground image parts 200*a*, 201*a*, 200*b* and 201*b* from the reference images based on the position coordinates and sizes of the foreground image parts 200*a*, 201*a*, 200*b* and 201*b* of the existent object 40, and generates the complemented background image parts by pasting the reference image parts to the background image parts to complement the lack of the foreground image parts.

FIGS. 7(*a*) to 7(*e*) are explanatory drawings showing the process performed by the background complementing unit 2. For example, the background complementing unit 2 receives the background image part 300*a* shown in FIG. 7(*c*) obtained by excluding the targeted foreground image part 200*a* shown in FIG. 7(*b*) extracted from the captured image 100*a* shown in FIG. 7(*a*). Subsequently, the background complementing unit 2 acquires a reference image part 350*a*, having the same position coordinates and size as the foreground image part 200*a* of the existent object as the target, from a reference image 350 shown in FIG. 7(*d*) based on the position coordinates and size of the foreground image part 200*a* of the existent object by using the foreground image capture information 500*a* regarding the foreground image part 200*a*. Subsequently, the background complementing unit 2 generates a complemented background image part 301*a* shown in FIG. 7(*e*) by pasting the reference image part 350*a* to the background image part 300*a* to complement the background image part 300*a*. In short, the background complementing unit 2 receives the background image part 300*a* excluding the foreground image part 200*a* as the input, and outputs the background image part 301*a* obtained by the background complementing by using the reference image 350.

(2-3) Background Image Synthesis Unit 3

Figure 8:
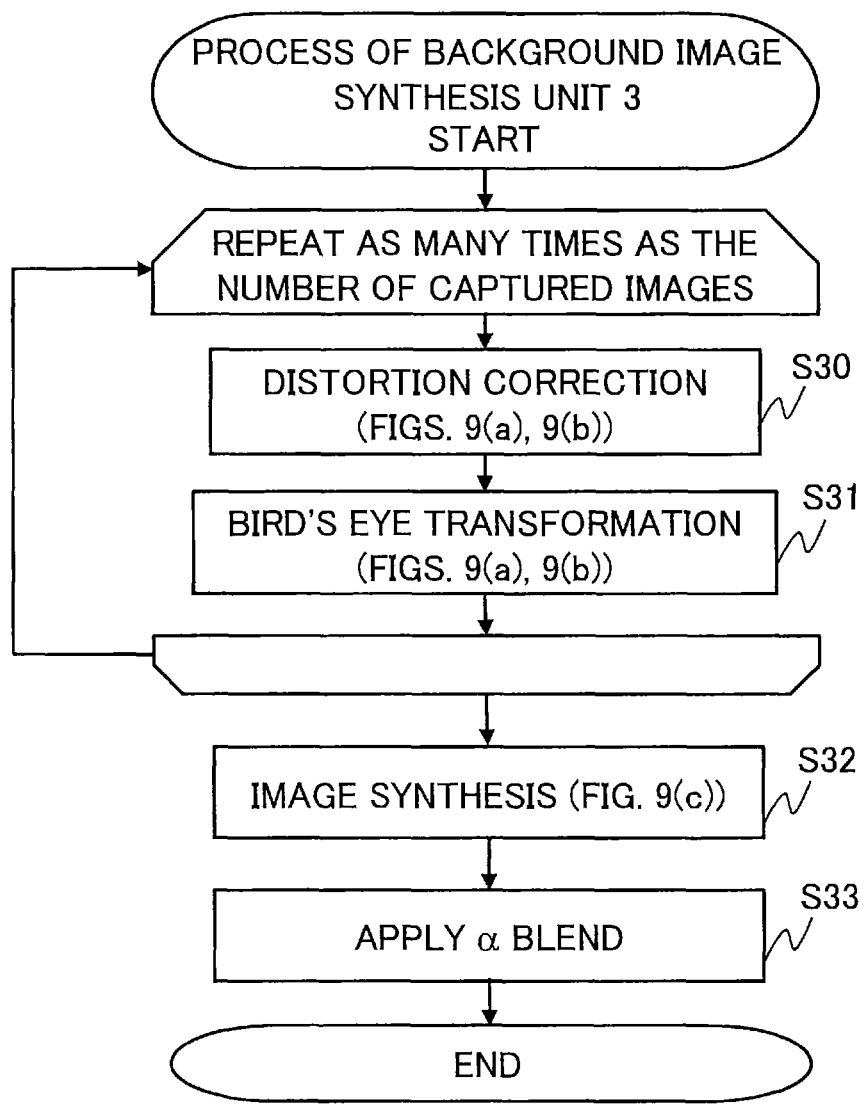
FIG. 8 is a flowchart showing a process performed by a background image synthesis unit of the image processing device according to the embodiment.

FIG. 8 is a flowchart showing the process performed by the background image synthesis unit 3 of the image processing device 10. The background image synthesis unit 3 receives the background image parts 301*a* and 301*b* after undergoing the background complementing by the background complementing unit 2 as inputs, performs the bird's eye transformation (viewpoint transformation) on the background image parts 301*a* and 301*b*, and generates the background bird's eye synthetic image 302 by combining together the background image parts after undergoing the bird's eye transformation.

Specifically, the background image synthesis unit 3 performs a distortion correction process, for correcting distortion occurring due to properties of the lens of the image capturing device 20*a* and distortion occurring due to properties of the lens of the image capturing device 20*b*, on the background image parts 301*a* and 301*b* after undergoing the background complementing (step S30).

Subsequently, the background image synthesis unit 3 performs the bird's eye transformation for transforming the viewpoint position so as to view the background image part 301*a* after undergoing the background complementing from above (e.g., from directly above) by using the external parameters of the image capturing device 20*a* (step S31). Further, the background image synthesis unit 3 performs the bird's eye transformation for transforming the viewpoint position so as to view the background image part 301*b* after undergoing the background complementing from above (e.g., from directly above) by using the external parameters of the image capturing device 20*b* (step S31).

Subsequently, the background image synthesis unit 3 combines together the background image parts 301*a* and 301*b* after the bird's eye transformation (step S32).

Subsequently, the background image synthesis unit 3 performs alpha blend on a region where the background image parts 301*a* and 301*b* after the bird's eye transformation overlap with each other (step S33). The alpha blend is an image synthesis method of superimposing two images on each other and combining the two images together based on transparency (αvalue) as a coefficient that has been set for each pixel. Conceptually, the a value indicates transparency from a perfectly nontransparent state at 0% transparency to a perfectly transparent state at 100% transparency. For example, the a value is a coefficient that takes on values from 0 to 1, and the transparency hits the maximum when the a value is at its minimum value (value 0) and nontransparency hits the maximum (fill-in) when the a value is at its maximum value (value 1).

Figure 9A:
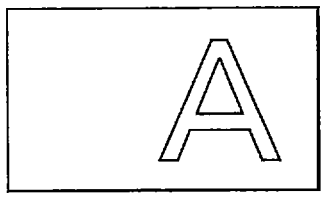
FIGS. 9(a) to 9(c) are explanatory drawings showing the process performed by the background image synthesis unit.
Figure 9A:
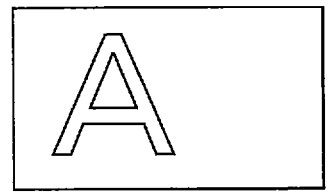
Figure 9B:
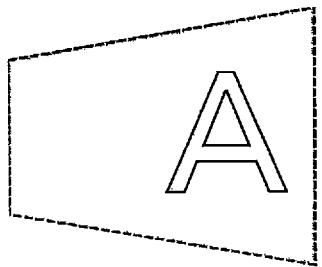
Figure 9B:
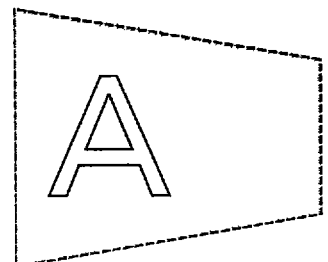
Figure 9C:
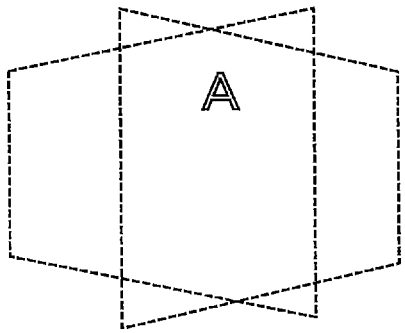

FIGS. 9(a) to 9(c) are explanatory drawings showing the process performed by the background image synthesis unit 3. The background image synthesis unit 3 generates the background image part 301a and the background image part 301b after the bird's eye transformation shown in FIG. 9(b) from the background image parts 301a and 301b shown in FIG. 9(a), and further generates the background bird's eye synthetic image 302 shown in FIG. 9(c). In order to generate the background bird's eye synthetic image 302, the image processing device 10 needs to previously perform the calibration of the image capturing devices 20a and 20b and thereby acquire the internal parameters and the external parameters. The internal parameters include information such as the focal length and the position and direction of the optical axis center of each optical member of the image capturing device. The external parameters include information regarding the camera position posture, including installation position (installation coordinate) information, installation posture (yaw, roll and pitch information) and so forth in the space as the image capture target. It is also possible for the background image synthesis unit 3 to use a previously prepared reference table for generating the background bird's eye synthetic image 302 from the background image part 301a and the background image part 301b.

(2-4) Solid Object Recognition Unit 4

Figure 10:
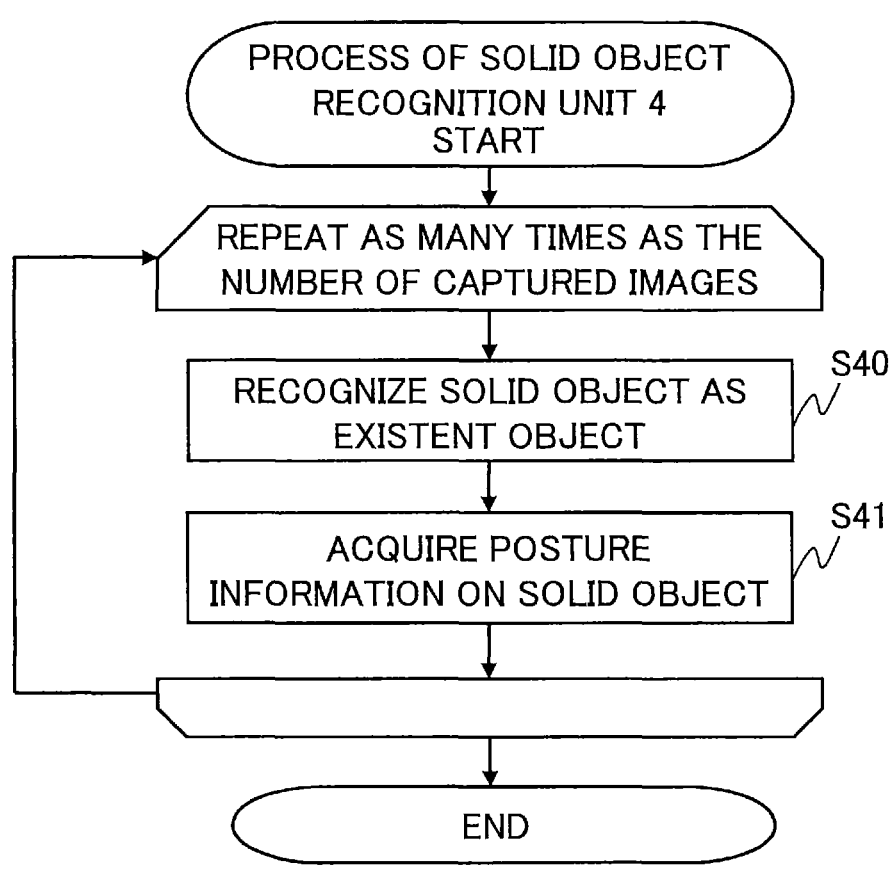
FIG. 10 is a flowchart showing a process performed by a solid object recognition unit of the image processing device according to the embodiment.

FIG. 10 is a flowchart showing the process performed by the solid object recognition unit 4 of the image processing device 10. The solid object recognition unit 4 performs the recognition of the existent object 40 as an actually existing solid object in the foreground image parts 200a, 201a, 200b and 201b extracted by the solid object extraction unit 1 (step S40).

Subsequently, the solid object recognition unit 4 acquires the posture information on the foreground image parts 200a and 200b extracted by the solid object extraction unit 1, that is, the posture information on the existent object, and stores the existent object ID, the existent object type and the posture information in the storage unit 16 (step S41). The posture information is a data table for the transformation from the two-dimensional coordinate pixel data as the foreground image parts 200a and 200b into the three-dimensional coordinate pixel data. The solid object recognition unit 4 may either previously obtain the posture information by image analysis in the foreground image parts or previously acquire the posture information by using a sensor other than the image capturing devices. The method of acquiring the posture information is not limited to a particular method. Especially when the existent object 40 is a person, skeletal structure information on the person can be acquired from the captured images, and thus the solid object recognition unit 4 may store the skeletal structure information on the person in the storage unit 16 as the posture information.

(2-5) Solid Object Projection Unit 5

Figure 11:
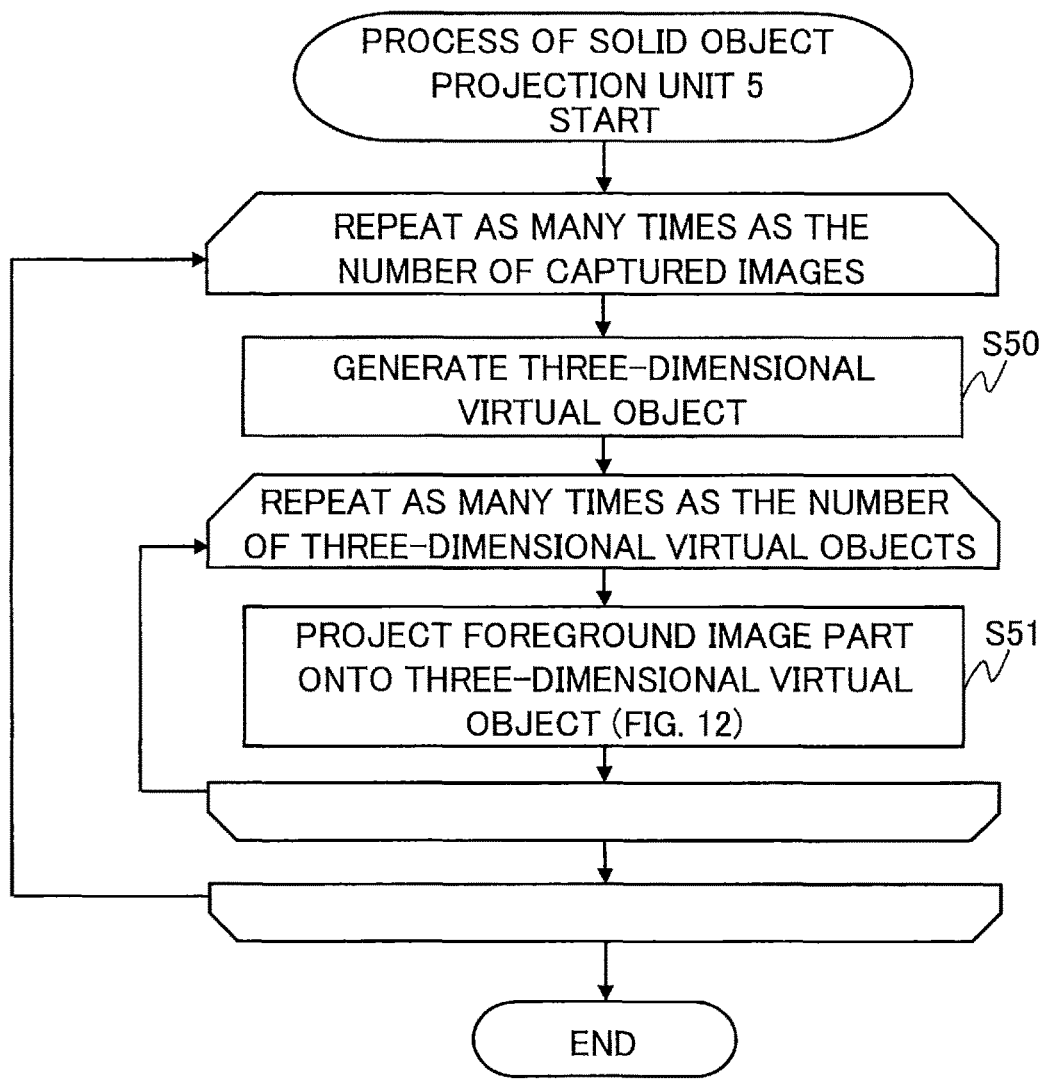
FIG. 11 is a flowchart showing a process performed by a solid object projection unit of the image processing device according to the embodiment.

FIG. 11 is a flowchart showing the process performed by the solid object projection unit 5 of the image processing device 10. The solid object projection unit 5 generates a three-dimensional virtual object from the posture information on the existent object acquired by the solid object recognition unit 4 (step S50).

Subsequently, the solid object projection unit 5 projects the two-dimensional foreground image part(s) extracted by the solid object extraction unit 1 onto the three-dimensional virtual object by using the posture information (step S51). Foreground image parts having the same existent object ID are projected onto the same three-dimensional virtual object.

Figure 12:
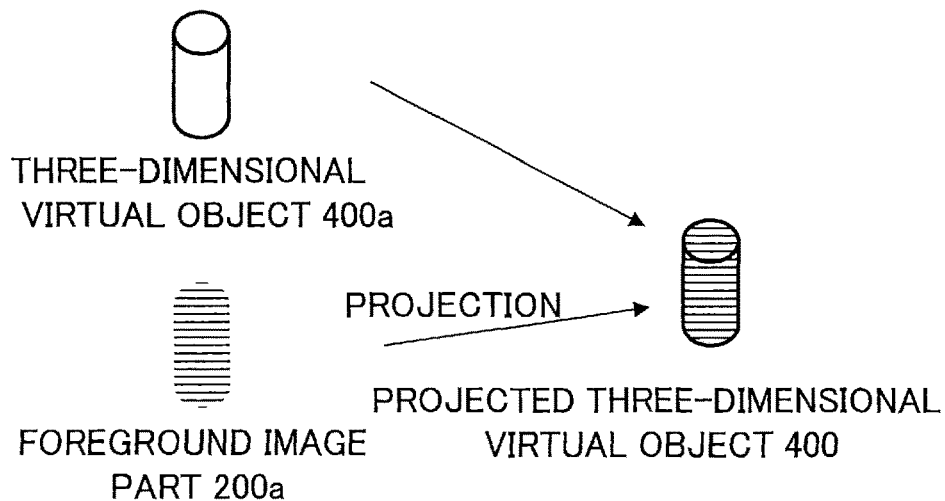
FIG. 12 is an explanatory drawing showing the process performed by the solid object projection unit.

FIG. 12 is an explanatory drawing showing the process performed by the solid object projection unit 5. The solid object projection unit 5 acquires (or generates) a three-dimensional virtual object 400a corresponding to the recognized existent object 40. The three-dimensional virtual object 400a is selected from a plurality of three-dimensional virtual object candidates previously stored in the storage unit 16 based on the corresponding existent object 40. Alternatively, the solid object projection unit 5 may generate the three-dimensional virtual object 400a by using the posture information. Subsequently, the solid object projection unit 5 projects the foreground image parts 200a and 200b extracted by the solid object extraction unit 1 onto the three-dimensional virtual object 400a. In this case, the solid object projection unit 5 generates the projected three-dimensional virtual object 400 by performing the projection onto the three-dimensional virtual object by using the posture information on the foreground image parts 200a and 200b.

(2-6) Three-dimensional Space Superimposition Unit 6

Figure 13:
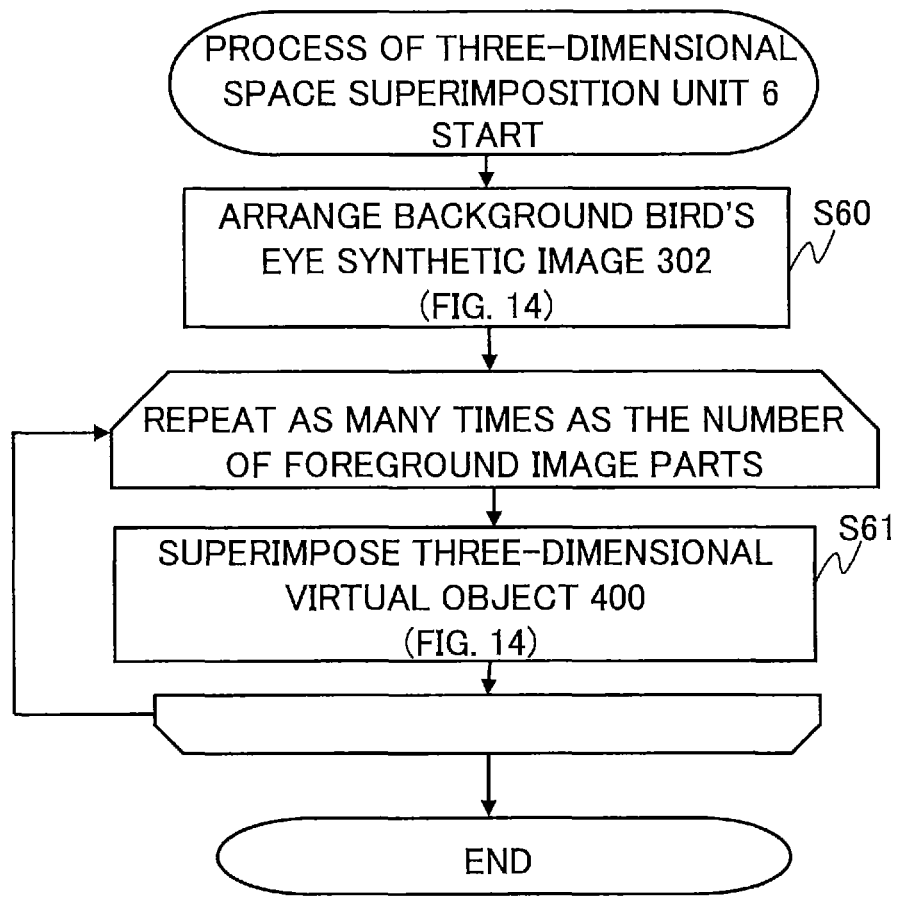
FIG. 13 is a flowchart showing a process performed by a three-dimensional space superimposition unit of the image processing device according to the embodiment.
Figure 14:
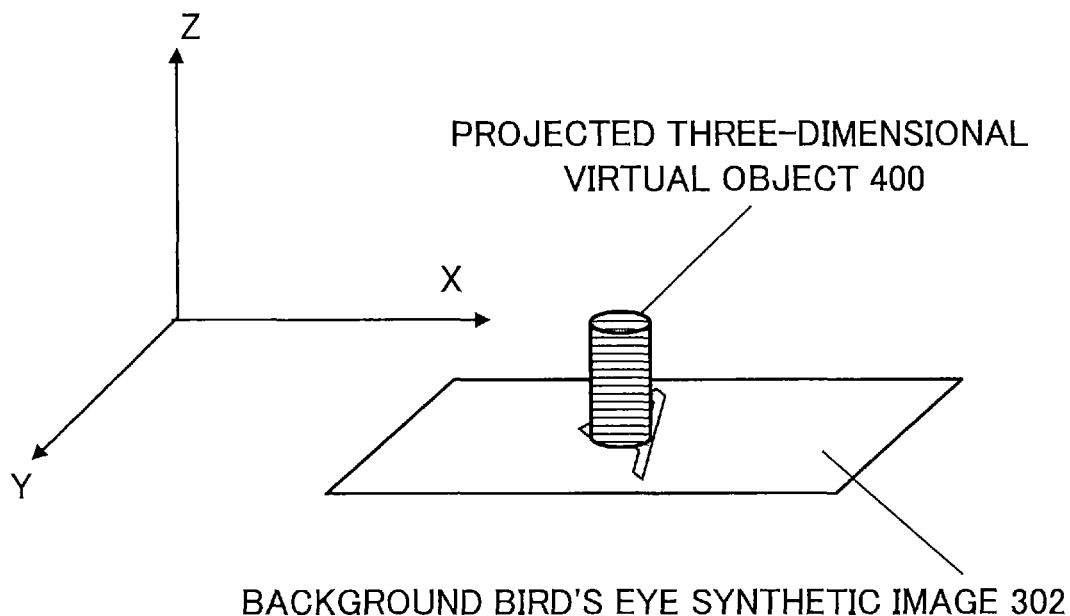
FIG. 14 is an explanatory drawing showing the process performed by the three-dimensional space superimposition unit.

FIG. 13 is a flowchart showing the process performed by the three-dimensional space superimposition unit 6 of the image processing device 10. FIG. 14 is an explanatory drawing showing the process performed by the three-dimensional space superimposition unit 6. The three-dimensional space superimposition unit 6 arranges the background bird's eye synthetic image 302 generated by the background image synthesis unit 3 in a three-dimensional space represented by an XYZ orthogonal coordinate system, on a plane at a height 0 (Z=0) (e.g., XY plane), for example (step S60).

Subsequently, the three-dimensional space superimposition unit 6 arranges the projected three-dimensional virtual object 400 generated by the solid object projection unit 5 in superimposition with the background bird's eye synthetic image 302 (step S61). The arrangement position of the three-dimensional virtual object 400 is at coordinates obtained by performing coordinate transformation on position information included in the foreground image capture information by using the internal parameters and the external parameters of the image capturing devices 20a and 20b.

(2-7) Display Image Output Unit 7

Figure 15:
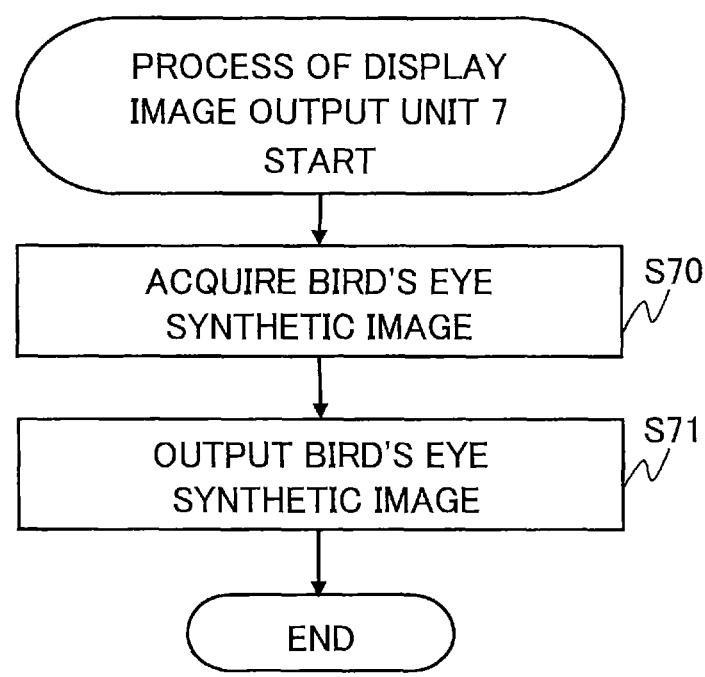
FIG. 15 is a flowchart showing a process performed by a display image output unit of the image processing device according to the embodiment.

FIG. 15 is a flowchart showing the process performed by the display image output unit 7 of the image processing device 10. The display image output unit 7 acquires the bird's eye synthetic image, including the background bird's eye synthetic image 302 and the three-dimensional virtual object 400 arranged in the three-dimensional space, generated by the three-dimensional space superimposition unit 6, that is, the bird's eye synthetic image as viewed from a designated viewpoint position (e.g., viewpoint position directly above the three-dimensional virtual object 400) (step S70).

Subsequently, the display image output unit 7 outputs the acquired bird's eye synthetic image to the display device 30 (step S71).

(3) Effect

As described above, with the image processing device 10 and the image processing method according to this embodiment, the background bird's eye synthetic image 302 in a planar shape and the three-dimensional virtual object 400 are arranged in a three-dimensional space. Accordingly, in cases where a plurality of captured images 100a and 100b are combined together, the solid object is not displayed doubly nor does disappear in the range where the captured images 100a and 100b overlap with each other.

Further, with the image processing device 10 and the image processing method according to this embodiment, when a plurality of existent objects 40 exist, the distortion can be suppressed individually by using the three-dimensional virtual object for each existent object, and thus a bird's eye image as viewed from directly above giving no feeling of strangeness can be generated.

Furthermore, with the image processing device 10 and the image processing method according to this embodiment, not only a bird's eye image as viewed from directly above but also a bird's eye synthetic image as viewed from an arbitrary viewpoint position can be generated. Accordingly, when the image processing device 10 is used for the purpose of monitoring, efficiency of the observer's monitoring work can be increased.

(4) Description of Modes of Use

The image processing device 10 and the image processing method according to this embodiment can be employed for a work monitoring system for monitoring workers in a factory.

Further, the image processing device 10 and the image processing method according to this embodiment can be employed for a driving support system that is mounted on a vehicle and detects and displays obstacles around the vehicle.

Furthermore, the image processing device 10 and the image processing method according to this embodiment can be employed for a production management system for managing work objects existing in a production line of a factory, a stock management system for monitoring stock status of finished products, and so forth.

DESCRIPTION OF REFERENCE CHARACTERS

1: solid object extraction unit (image division unit), 2: background complementing unit, 3: background image synthesis unit, 4: solid object recognition unit, 5: solid object projection unit, 6: three-dimensional space superimposition unit, 7: display image output unit, 10: image processing device, 11: processor, 12: memory, 13: storage device, 14: image input interface, 15: display device interface, 16: storage unit, 20a, 20b: image capturing device, 30: display device, 40: existent object (solid object), 100a, 100b: captured image, 200a, 201a, 200b, 201b: foreground image part, 300a, 300b: background image part, 302: background bird's eye synthetic image, 350: reference image, 350a: reference image part, 400: projected three-dimensional virtual object, 400a: three-dimensional virtual object, 500a, 501a, 500b, 501b: foreground image capture information.

What is claimed is:

1. An image processing device comprising:
a processor to execute a program; and
a memory to store the program which, when executed by the processor, performs processes of,
dividing a first captured image provided from a first image capturing device capturing an image of an image capture target region into a first foreground image part occupied by an existent object as a solid object actually existing in the image capture target region and a first background image part other than the first foreground image part and dividing a second captured image provided from a second image capturing device capturing an image of the image capture target region into a second foreground image part occupied by the existent object as the solid object actually existing in the image capture target region and a second background image part other than the second foreground image part;
generating a complemented first background image part by complementing the first background image part by pasting a reference image part as a part of a previously acquired reference image to a region of the first foreground image part occupied by the existent object and generating a complemented second background image part by complementing the second background image part by pasting the reference image part to a region of the second foreground image part occupied by the existent object;
generating a background bird's eye synthetic image by performing bird's eye transformation of changing a viewpoint position of the complemented first background image part and a viewpoint position of the complemented second background image part and combining the first background image part and the second background image part after the bird's eye transformation;
recognizing the existent object and acquiring posture information on the existent object;
acquiring a three-dimensional virtual object corresponding to the existent object by using the posture information, projecting the first foreground image part or the second foreground image part onto the three-dimensional virtual object, and generating the three-dimensional virtual object on which the first or second foreground image part is projected;
generating a three-dimensional space image by superimposing the three-dimensional virtual object on which the foreground image part is projected on the background bird's eye synthetic image; and
generating and outputting a bird's eye synthetic image as an image of the three-dimensional space image as viewed from above.

2. The image processing device according to claim 1, wherein
the background bird's eye synthetic image generated from the complemented first background image part and the complemented second background image part is arranged in a virtual three-dimensional space, and
the three-dimensional virtual object on which the foreground image part is projected is arranged in the virtual three-dimensional space arranged the background bird's eye synthetic image.

3. The image processing device according to claim 1, wherein the memory previously stores a plurality of candidates for the three-dimensional virtual object.

4. The image processing device according to claim 1, wherein the reference image is a captured image previously captured by the first image capturing device or the second image capturing device.

5. The image processing device according to claim 1, wherein the memory previously stores the reference image.

6. The image processing device according to claim 1, wherein when the existent object is a person, the posture information includes skeletal structure information on the person.

7. The image processing device according to claim 1, wherein the bird's eye synthetic image is an image in which the existent object is viewed from directly above.

8. An image processing method comprising:
dividing a first captured image provided from a first image capturing device capturing an image of an image capture target region into a first foreground image part occupied by an existent object as a solid object actually existing in the image capture target region and a first background image part other than the first foreground image part and dividing a second captured image provided from a second image capturing device capturing an image of the image capture target region into a second foreground image part occupied by the existent object as the solid object actually existing in the image capture target region and a second background image part other than the second foreground image part;
generating a complemented first background image part by complementing the first background image part by pasting a reference image part as a part of a previously acquired reference image to a region of the first foreground image part occupied by the existent object and generating a complemented second background image part by complementing the second background image part by pasting the reference image part to a region of the second foreground image part occupied by the existent object;
generating a background bird's eye synthetic image by performing bird's eye transformation of changing a viewpoint position of the complemented first background image part and a viewpoint position of the complemented second background image part and combining the first background image part and the second background image part after the bird's eye transformation;
recognizing the existent object and acquiring posture information on the existent object;
acquiring a three-dimensional virtual object corresponding to the existent object by using the posture information, projecting the first foreground image part or the second foreground image part onto the three-dimensional virtual object, and generating the three-dimensional virtual object on which the first or second foreground image part is projected;
generating a three-dimensional space image by superimposing the three-dimensional virtual object on which the foreground image part is projected on the background bird's eye synthetic image; and
generating and outputting a bird's eye synthetic image as an image of the three-dimensional space image as viewed from above.

9. A non-transitory computer-readable recording medium storing a program that causes a computer to execute:
dividing a first captured image provided from a first image capturing device capturing an image of an image capture target region into a first foreground image part occupied by an existent object as a solid object actually existing in the image capture target region and a first background image part other than the first foreground image part and dividing a second captured image provided from a second image capturing device capturing an image of the image capture target region into a second foreground image part occupied by the existent object as the solid object actually existing in the image capture target region and a second background image part other than the second foreground image part;
generating a complemented first background image part by complementing the first background image part by pasting a reference image part as a part of a previously acquired reference image to a region of the first foreground image part occupied by the existent object and generating a complemented second background image part by complementing the second background image part by pasting the reference image part to a region of the second foreground image part occupied by the existent object;
generating a background bird's eye synthetic image by performing bird's eye transformation of changing a viewpoint position of the complemented first background image part and a viewpoint position of the complemented second background image part and combining the first background image part and the second background image part after the bird's eye transformation;
recognizing the existent object and acquiring posture information on the existent object;
acquiring a three-dimensional virtual object corresponding to the existent object by using the posture information, projecting the first foreground image part or the second foreground image part onto the three-dimensional virtual object, and generating the three-dimensional virtual object on which the first and second foreground image part is projected;
generating a three-dimensional space image by superimposing the three-dimensional virtual object on which the foreground image part is projected on the background bird's eye synthetic image; and
generating and outputting a bird's eye synthetic image as an image of the three-dimensional space image as viewed from above.

* * * * *